(12) United States Patent
Kiyomizu et al.

(10) Patent No.: US 8,223,199 B2
(45) Date of Patent: Jul. 17, 2012

(54) FINGER VEIN AUTHENTICATION UNIT AND INFORMATION PROCESSING UNIT

(75) Inventors: Harumi Kiyomizu, Kokubunji (JP);
Naoto Miura, Kokubunji (JP);
Takafumi Miyatake, Hachioji (JP);
Akio Nagasaka, Kokubunji (JP);
Souichi Sakurai, Yokohama (JP);
Hitoshi Takizawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1055 days.

(21) Appl. No.: 12/146,044

(22) Filed: Jun. 25, 2008

(65) Prior Publication Data

US 2009/0174766 A1    Jul. 9, 2009

(30) Foreign Application Priority Data

Jun. 28, 2007    (JP) .................. 2007-169873

(51) Int. Cl.
*H04N 7/18*    (2006.01)
(52) U.S. Cl. ............................ 348/77; 348/61
(58) Field of Classification Search ............ 348/61, 348/77, 135; 382/115; 340/5.82, 5.83
See application file for complete search history.

(56) References Cited

U.S. PATENT DOCUMENTS

| | | | |
|---|---|---|---|
| 2002/0135995 A1* | 9/2002 | Fujita et al. | 362/27 |
| 2003/0118219 A1* | 6/2003 | Higuchi et al. | 382/125 |
| 2004/0184641 A1 | 9/2004 | Nagasaka | |
| 2005/0254690 A1* | 11/2005 | Nagasaka et al. | 382/115 |
| 2006/0098848 A1 | 5/2006 | Nagasaka | |
| 2007/0014437 A1* | 1/2007 | Sato | 382/115 |
| 2008/0075330 A1* | 3/2008 | Matsumura et al. | 382/115 |
| 2009/0322899 A1* | 12/2009 | Chan et al. | 348/222.1 |

FOREIGN PATENT DOCUMENTS

| | | |
|---|---|---|
| EP | 1 654 984 A2 | 5/2006 |
| JP | 2004-265269 | 9/2004 |
| JP | 2006-155575 | 6/2006 |
| JP | 2006-331441 A | 12/2006 |
| JP | 2008-005854 | 1/2008 |

OTHER PUBLICATIONS

Hitachi, Ltd., Finger Vein Authentication: White Paper, 2006, 4 pp.

\* cited by examiner

*Primary Examiner* — Joshua Joo
(74) *Attorney, Agent, or Firm* — Mattingly & Malur, PC

(57) ABSTRACT

In a finger vein authentication unit and an information processing unit using the same, in order to realize a reduction in size and maintain high accuracy such that the finger vein authentication unit is applied to a small-sized information processing unit such as a mobile telephone, the finger vein authentication unit includes a light source which irradiates infrared light to a finger, an imaging sensor which images a vein image by the light which is diffused in the finger and transmitted through the front side of the finger, and an image processing unit which processes the image. The light source is mounted on the front side of the finger and emits the light toward the side surfaces of the finger. Further, a wall is disposed on either side of the finger vein authentication unit for supporting the finger and guiding the irradiated infrared light.

13 Claims, 13 Drawing Sheets

FIG. 16A  FIG. 16B  FIG. 16C
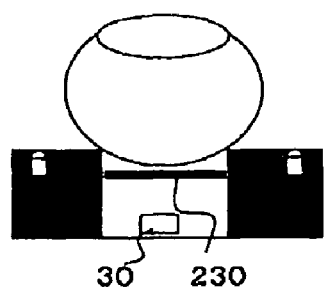
FIG. 17
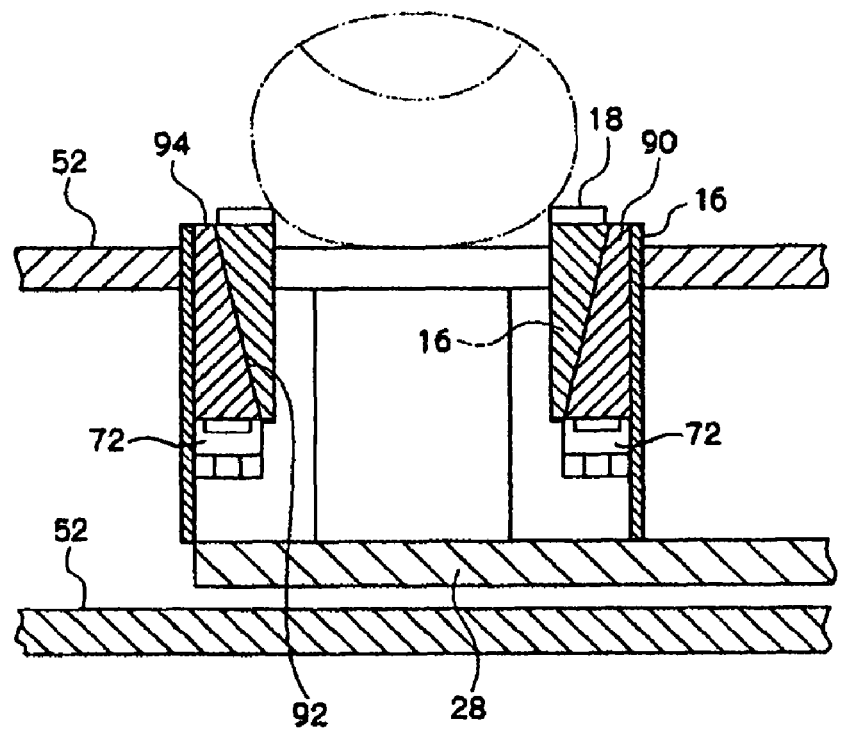

FINGER VEIN AUTHENTICATION UNIT AND INFORMATION PROCESSING UNIT

CLAIM OF PRIORITY

The present application claims priority from Japanese application JP2007-169873 filed on Jun. 28, 2007, the content of which is hereby incorporated by reference into this application.

FIELD OF THE INVENTION

The present invention relates to a finger vein authentication unit and an information processing unit using the same, and more particularly, to a technology of downsizing a finger vein authentication unit.

DESCRIPTION OF RELATED ART

Among various security technologies, a finger vein can realize high-accuracy authentication. Since finger vein authentication uses a finger vein pattern in a human body, excellent authentication accuracy can be realized and forgery in the finger vein authentication is more difficult as compared with that in fingerprint authentication. Thus, advanced security can be realized.

As a conventional example of this type of finger vein authentication, for example, a biometric authentication apparatus disclosed in JP-A-2006-155575 is known. The biometric authentication apparatus includes a light source for emitting light to be transmitted through a finger, an imaging unit for imaging the light transmitted through the finger, a finger detection means for detecting that the finger exists in a predetermined position, a finger region extraction means for extracting a region occupied by the finger from an image imaged by the imaging unit, and a gain changing means for changing an amplification factor of imaging sensors in the imaging unit on the basis of a picture quality of a specific region within the extracted region.

The finger vein authentication has an advantage that the authentication unit can be downsized as compared with other biometric authentication methods. However, recently, by the spread of electronic commerce or an online bank using a small-sized information device such as a mobile telephone, a finger vein authentication unit needs to be further downsized so as to be applied to the small-sized information device.

The biometric authentication apparatus disclosed in JP-A-2006-155575 is of an imaging type which can obtain optimal quality of the vein pattern without being influenced by an external environment variation, in the imaging of the finger vein pattern by the transmitted light, but the downsizing of the authentication apparatus is not described.

SUMMARY OF THE INVENTION

Accordingly, an object of the present invention is to provide a finger vein authentication unit which is applicable to a small-sized device such as a mobile telephone, and an information processing unit using the same.

According to an aspect of the present invention, there is provided a finger vein authentication unit including a light source which irradiates light to a finger, an imaging unit which images a vein image by the light which is diffused and transmitted through the front side of the finger, and an image processing unit which processes the image, wherein the light source is mounted on the front side of the finger and emits the light toward the side surfaces of the finger.

According to the present invention, it is possible to provide a finger vein authentication unit with a small size and high accuracy, which is capable of being applied to a small-sized information processing unit such as a mobile telephone, and an information processing unit using the same.

Other objects, features and advantages of the invention will become apparent from the following description of the embodiments of the invention taken in conjunction with the accompanying drawings.

BRIEF DESCRIPTION OF SEVERAL VIEWS OF DRAWING

FIGS. 16A to 16C are views showing an embodiment of a finger vein authentication unit in which a neutral density filter is mounted.

FIG. 17 is a cross-sectional view of a finger vein authentication unit including a light guide for guiding light generated by a light source (LED) to an irradiation port of a casing.

DETAILED DESCRIPTION OF THE INVENTION

Next, embodiments according to the present invention will be described. A finger vein authentication unit in an embodiment includes an imaging unit for irradiating light from light irradiation ports 14 mounted on the front side of a finger into the finger and imaging an image based on the light, which is diffused in the finger and transmitted through the vein, and an image processing unit for extracting a vein pattern from the image and performing personal authentication.

In order to allow the imaging unit of the finger vein authentication unit to clearly pick up an image of a finger vein pattern in the imaged portion, the following optical conditions needs to be satisfied. As one condition, infrared light reflected from the skin surface of the finger is not imaged by the imaging unit. If this condition is not satisfied, the image of the finger vein pattern includes unnecessary information of wrinkles of the skin surface of the finger, and thus, becomes unclear. As another condition, infrared light diffused without reaching a depth in which the finger vein exists is not imaged by the imaging unit. If this condition is not satisfied, the infrared light which does not include the information of the finger vein pattern deteriorates the contrast of the finger vein pattern.

Figure 1:
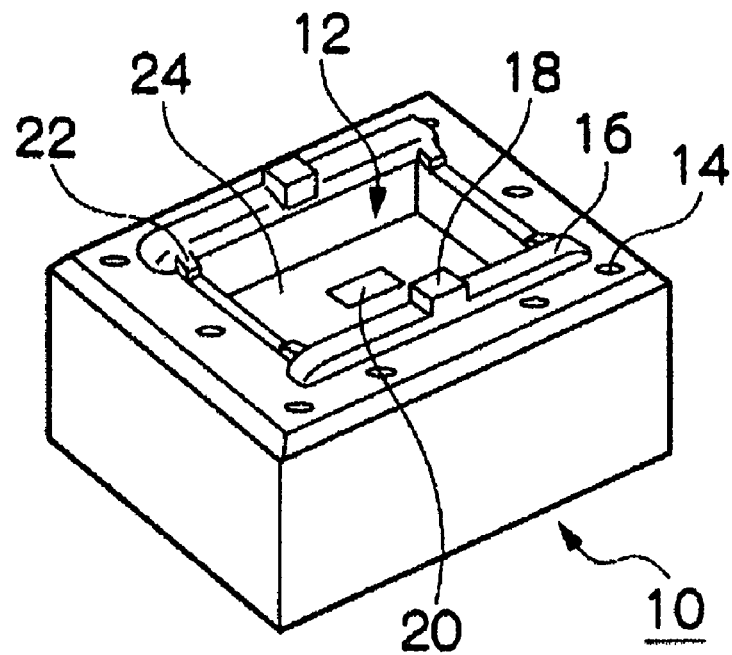
FIG. 1 is a perspective view of a finger vein authentication unit according to a first embodiment of the present invention.
Figure 2:
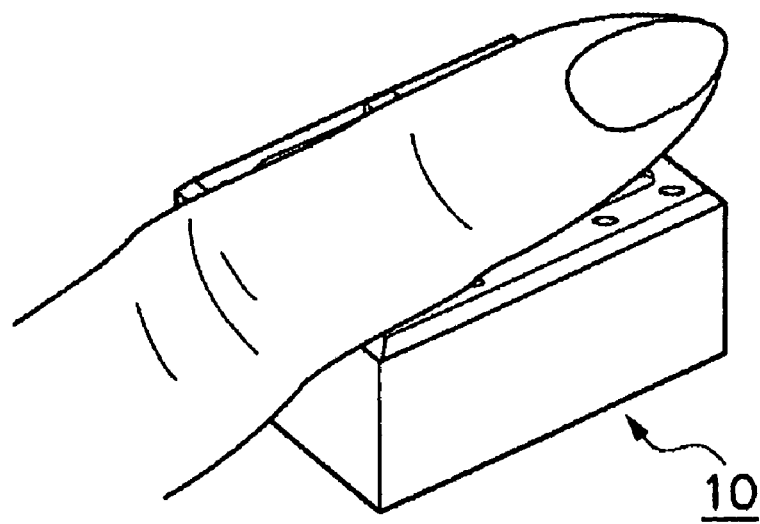
FIG. 2 is a perspective view showing a state that a finger is laid on the finger vein authentication unit.

FIG. 1 is a perspective view of a finger vein authentication unit according to an embodiment of the present invention, which includes a cubical casing 10. The finger is laid on a topside of the casing 10 as shown in FIG. 2. A groove 12 for separating the finger to be authenticated and an optical system is provided in the topside of the casing. In the case where a short focus/wide angle lens unit is applied to the optical system, the depth of the groove 12 can be further reduced and thus the size of the finger vein authentication unit can be downsized in a thickness direction.

The width of the groove 12 is narrower than that of the finger. A user lays his/her finger so as to cover the whole groove 12 as shown in FIG. 2. Accordingly, it is possible to prevent light emitted from the light irradiation ports 14 mounted on the side of the finger or external light from being directly irradiated to the surface of the front side of the finger on the groove 12. Since the light reflected from the surface of the finger is reduced, it is possible to photograph a clear vein image.

A rectangular opening 20 for inputting transmitted light from the finger is provided in a bottom surface 24 of the groove 12. An infrared transmission filter (IR filter) is mounted in the port. The IR filter blocks external light, such as solar light and light of a fluorescent lamp, unnecessary for authentication and prevents dust from entering into the authentication unit.

A reference numeral 16 of FIG. 1 denotes a wall having a relatively small height and protruding to the finger side. This wall is formed in a strip shape in a longitudinal direction of the finger at the both sides of the finger. A pair of the walls faces each other in parallel and has a function for supporting the finger when the finger is laid on the topside of the casing 10 such that the finger is prevented from being shifted in a horizontal direction. The wall 16 is made of a material which is opaque with respect to the infrared light. Accordingly, the wall also has a function for guiding the light emitted from the plurality of the light irradiation ports 14 arranged on the outer edge of the top surface of the casing to the side surface of the finger instead of the bottom of the finger. If the light is made incident from the side surface of the finger, a light component reaching a deep portion of the finger with respect to the vein pattern to be photographed is increased. Since such a reflected light component which deteriorates picture quality is reduced based on this, it is possible to photograph a clear transmitted light.

Small protrusions 18 protruding to the finger side in a small rectangular shape are formed in a substantially central portion of the wall 16 in the longitudinal direction. The small protrusions 18 serve to indicate a first joint of the finger. The user lays his/her finger on the casing such that the first joint of the finger is brought into contact with a pair of small protrusions 18. Thus, a vein pattern located in the vicinity of the first joint of the finger can be input to a lens unit and an imaging sensor. The joint portion of the finger is narrower than other portions and is susceptible to be fitted between the small protrusions according to the narrow shape. In the finger vein authentication, the vein pattern in the vicinity of the first joint of the finger is useful for high-accuracy biometric identification. This is because the skin in the vicinity of the joint is thin and thus the vein is susceptible to be viewed. The small protrusions 18 may be mounted at a position where the fingertip is laid as well as the position of the first joint. The finger is brought into contact with a plurality of points such that the position of the finger is stabilized. Touch sensors may be mounted in the small protrusions 18. Accordingly, it is possible to detect that the finger is accurately laid on the casing 10 and photograph the finger. Thus, the indicating position of the finger can be stabilized and the finger can be prevented from being photographed in a state of being separated from the unit. The opening 20 for inputting transmitted light has, for example, a rectangular shape having an area which can input the image in the vicinity of the first joint of the finger. For example, the rectangular opening 20 for inputting transmitted light having a long side (20 mm) and a short side (10 mm) is provided.

The vein in the vicinity of a second joint of the finger is susceptible to be viewed according to the above-described reason. Therefore, the small protrusions 18 may be diverted into the positioning of the second joint for serving for the authentication. If the second joint is positioned, the finger significantly protrudes from the authentication unit to the side of the fingertip and thus a wider opened space is necessary at the side of the fingertip if the authentication unit is mounted. In order to compactly use the authentication unit, the use of the first joint is preferable.

Figure 20A:
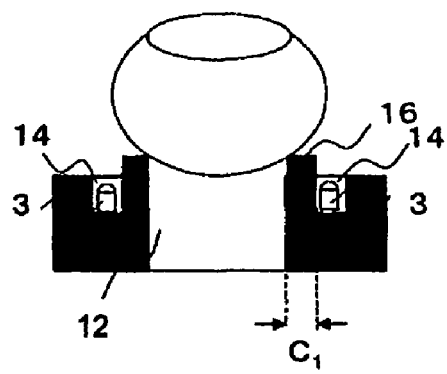
FIGS. 20A and 20B are cross-sectional views of the finger vein authentication unit of FIG. 2 when viewed from the end side of the finger.

FIG. 20A is a cross-sectional view showing a position where a light source 3 is mounted when the casing 10 of FIG. 2 is viewed from the side of the fingertip. An infrared light source 3 is embedded in the light irradiation port 14. For example, a light emitting diode (LED) can be used as the light source 3. A mold type LED shown in FIG. 20A may be used or an LED of which an upper surface has a flat surface shape may be used. The light source 3 may be completely embedded such that the upper surface of the light source 3 is located at a position lower than that of the casing 10, or the upper surface of the light source is located at a position slightly higher than that of the casing. In the case where the light source is completely embedded, it is possible to realize a flat authentication unit having small irregularities. In the case where the upper surface of the light source 3 is mounted so as to slightly protrude from the casing, a distance between the finger and the light source is reduced and thus the vein can be photographed although the amount of light output from the light source 3 is small. Accordingly, it is possible to suppress power consumption of the unit.

Hereinafter, the mount position of the light source 3 will be described. In the authentication unit according to the present invention, the light source 3 is mounted at the front side of the finger. In the conventional finger vein authentication unit, since the light source is mounted at the upper side or the lateral side of the finger, a casing for supporting the light source at the upper side or the lateral side of the finger was required. Accordingly, the unit thickened. If the light source is mounted at the front side of the finger, the casing is not required at the upper side or the lateral side of the finger, and thus the unit can thin. In the present invention, as described below, the light source 3 is mounted at the lateral side of the finger in order to reduce the influence of the wrinkles of the surface of the finger.

A plurality of wrinkles of joints or fingerprints exist in the surface of the finger. In order to increase the authentication accuracy, the influence of the wrinkles should be suppressed and only the vein should be clearly photographed. In order to suppress the influence of the wrinkles, the light source is mounted in consideration of the directions of the wrinkles. For example, in the case where the directions of the wrinkles are perpendicular to the longitudinal direction of the finger, the light source is mounted at the lateral side of the finger. Thus, the path of the light irradiated from the light source and the directions of the wrinkles become parallel. Accordingly, since the light reaches the imaging sensor without colliding with the wall of the wrinkles, it is possible to photograph an image in which the influence of the wrinkles is suppressed.

As described above, in the present invention, the vicinity of the first joint of the finger is photographed and the authentication is performed. The wrinkles in the vicinity of the first joint are mostly perpendicular to the longitudinal direction of the finger. Accordingly, in the present invention, the mount position of the light source is the lateral side of the finger.

In the image processing of the finger vein authentication, the brightness value of each of the pixels in the image is examined and the pixel having brightness lower than those of the peripheral pixels is extracted as the vein. Accordingly, in order to perform high-accuracy authentication, it is important to irradiate a uniform amount of light to the whole finger such that an image having low brightness unevenness is photographed. If only a partial region is darkly photographed due to deflection when the light is irradiated, the region is mistakenly extracted as a blood vessel when the image processing is performed.

FIGS. 24A to 24F show an example of mounting the light source 3 and the light irradiation port 14 which are used for photographing the image having the low brightness unevenness. FIGS. 24A to 24F are views showing the casing 10 when viewed from the upper surface thereof.

Figure 24A:
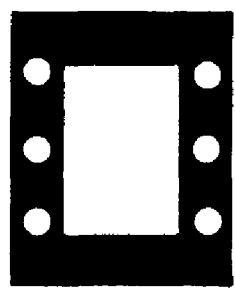
FIGS. 24A to 24F are a top view of a casing, for describing the position where the light source is mounted.
Figure 24B:
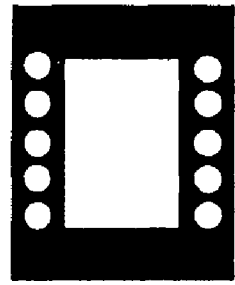
Figure 24C:
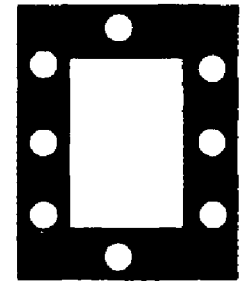

Although the light source 3 may be mounted at the left and right sides one by one if the light can be irradiated to the finger with sufficient brightness, it is preferable that a plurality of light sources are mounted in the longitudinal direction of the finger as shown in FIG. 24A or FIG. 24B, in order to further improve picture quality. In this case, the light sources are uniformly mounted at the left and right sides at an interval. Accordingly, the light can be irradiated from the side of the fingertip to the base side of the finger with uniform brightness. As described below, it is efficient that the amounts of light of the left, right, front and back light sources are independently controlled. Since the sufficient light does not reach the side of the fingertip and the base side of the finger only by the light sources on the lateral side of the finger, the light sources 3 are provided at the side of the fingertip and the base side of the finger such that the light is irradiated subsidiarily, as shown in FIG. 24C.

Figure 24D:
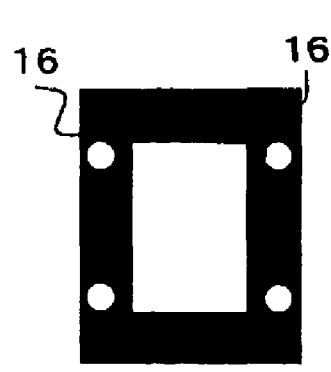
Figure 24E:
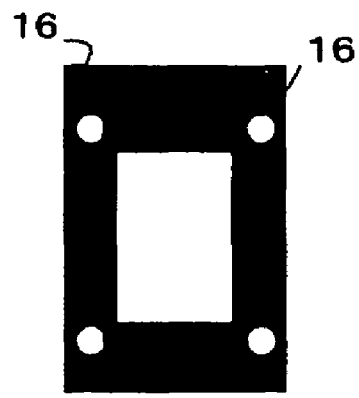
Figure 24F:
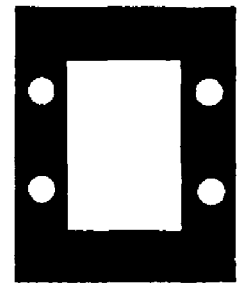

In the case where the plurality of light sources 3 are mounted, as shown in FIG. 24F, all the light sources 3 may be mounted such that the interval in the vicinity of the central portion is than larger than that of the interval in the side of the fingertip and the base side of the finger, instead of the completely same interval. In this authentication unit, as described above, the photographing operation is performed in a state in which the first joint is laid on the central portion of the groove 12. Since the skin of the first joint is thin, the vein can be photographed using a smaller amount of light compared with other portions. Accordingly, the mount positions of the light sources 3 are the outside of the position of the first joint as shown in FIG. 24F. Accordingly, strong light is irradiated to the portions other than the first joint and slightly weak light is irradiated to the first joint. Thus, the amount of light of the whole image becomes uniform.

The optimal arrangement of the light sources varies according to the characteristics of an optical part used for photographing. As described below, in order to downsize the casing of the finger vein authentication unit, a short focus lens unit is preferably used. However, the short focus lens has a property that the brightness is susceptible to deteriorate toward the edge of the image. If the photographing operation is performed by using such a lens, the brightness of a region which is separated from the center of the image, that is, a region located at the side of the fingertip or the base side of the finger, deteriorates. Accordingly, as shown in FIG. 24D or 24E, the light sources 3 are arranged close to the upper side and the lower side. When the finger is laid on the arrangement, stronger light is irradiated to the lateral side of the side of the fingertip and the lateral side of the base side of the finger. Accordingly, the whole brightness of the photographed image becomes uniform.

As shown in FIGS. 24D and 24E, in the case where the light sources are arranged at the side of the fingertip and the base side of the finger, the light emitted from the light source may be guided to the front side of the side of the fingertip and the base side of the finger. As described above, in order to make the wrinkles in the vicinity of the first joint not to be conspicuous, the irradiation from the lateral surface of the finger is efficient and the light should be prevented from being guided to the front side of the side of the fingertip and the base side of the finger. Accordingly, as shown in FIG. 24D, a U-shaped wall 16 is mounted. Alternatively, as shown in FIG. 24E, the wall 16 extends in the longitudinal direction of the finger.

Accordingly, it is possible to irradiate the light to only the lateral surfaces of the side of the fingertip and the base side of the finger.

As shown in FIG. 20A, the light sources 3 are mounted at the left and right sides of the finger in a direction substantially perpendicular to a finger rest. Since the finger has a round shape when viewed from the side of the fingertip, the light sources 3 are mounted at the lateral side of the finger and the light can be irradiated to the high position in the finger when the light is irradiated upward. Accordingly, the contrast of the vein image is increased. Although the light sources 3 are mounted at the outside of the finger in FIG. 20A, the light sources 3 may be mounted at the inside of the finger (at the side close to the groove 12). Accordingly, it is possible to downsize the unit. Even in the case where the light sources are mounted at the inside of the finger, it is possible to obtain the same effect as the lateral side irradiation and photograph a clear vein image.

The light sources 3 are mounted at positions separated from the groove 12. Accordingly, it is possible to suppress the light input from the bottom surface of the finger. The present inventors confirmed that the light input from the bottom surface of the finger is reduced and a clear vein image can be photographed if the distance ($C_1$ of FIG. 20A) between the end of the groove 12 and the light source 3 is equal to or greater than 2 mm, as the result of examination which is performed by various changing the mount positions of the light sources 3.

Figure 20B:
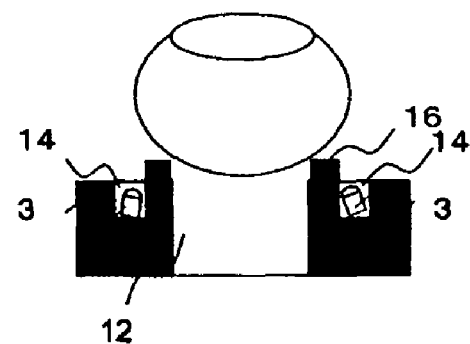

The light sources 3 may be mounted slightly toward the inside of the casing as shown in FIG. 20B. Accordingly, even when a thin finger is laid on the casing 10, a sufficient amount of light can be irradiated to the finger. Alternatively, a plurality of light sources having different mount angles may be mounted and the light sources 3 which are turned on may be changed according to fingers to be authenticated. Accordingly, it is possible to cope with fingers having various thicknesses. It may be possible to adjust it by controlling the mount angles of the light sources according to the laid fingers.

Figure 3:
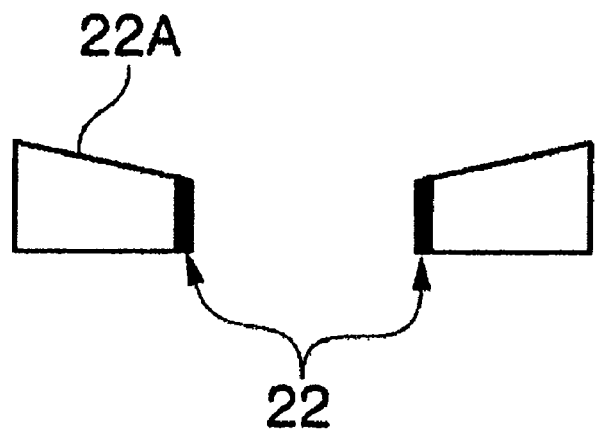
FIG. 3 is an enlarged view of a small piece of the finger vein authentication unit of FIG. 1.

A reference numeral 22 of FIG. 1 denotes a pair of small pieces protruding from the pair of walls 16 toward the center of the casing 10 in the substantial end of the side of the fingertip and the substantial end of the arm side of the finger of the casing 10. As can be seen from FIG. 3 showing the front view of the small piece when viewed in a direction denoted by an arrow of FIG. 1, each of the small pieces 22 has a taper surface 22a of which the height is decreased toward the center side of the casing 10.

When the finger is laid on the topside of the casing 10, the finger is guided along the taper surface 22A in the direction of the bottom surface of the casing and is closely attached to the casing. Accordingly, it is possible to prevent the external light from being made incident from the gap between the finger and the casing 10 to the casing of the authentication unit.

Figure 4:
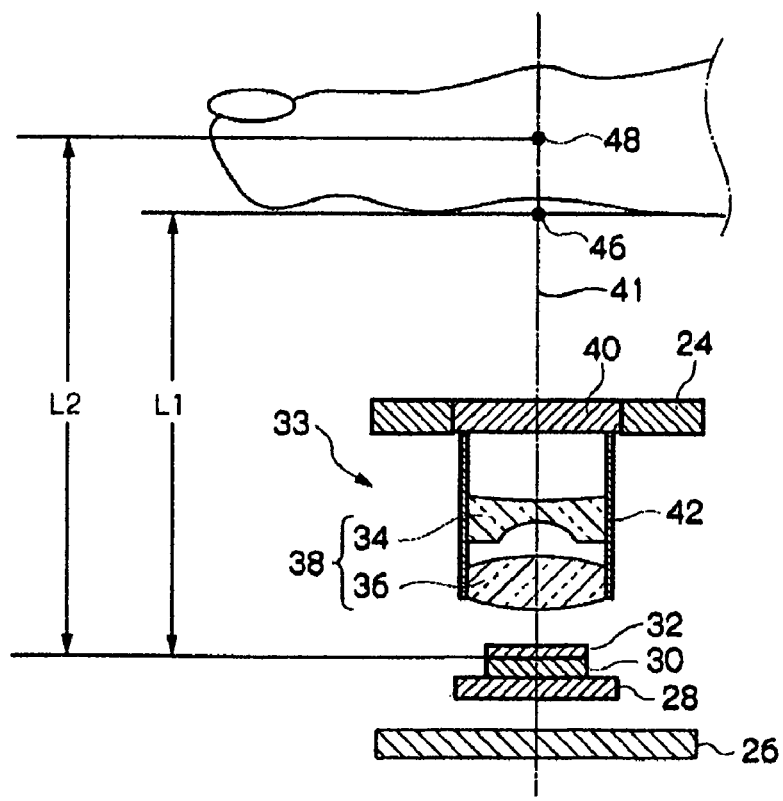
FIG. 4 is a schematic cross-sectional view of the finger vein authentication unit.

FIG. 4 is a cross-sectional view showing the configuration of the imaging unit. The imaging unit shown in FIG. 4 includes a lens device 33 and an imaging sensor 30. The lens device 33 and the imaging sensor 30 are arranged along an optical axis 41 of the transmitted light emitted toward the opening 20 for inputting transmitted light after the light irradiated from the light source 14 of FIG. 1 is diffused in the finger and is spread in the whole finger.

The lens device 33 makes the transmitted light focus into an image on the imaging sensor 30 and the lens unit 38 including a first lens 34 at the finger side and a second lens 36 at the image sensor side is supported and fixed by a lens casing 42. The first lens 34 and the second lens 36 are received in the lens casing 42 so as to face each other along the optical axis.

The first lens 34 and the second lens 36 have a diameter of about 1 mm to 1.5 mm, the first lens 34 is a concave lens having a concave portion at the side of the imaging sensor 30 and the second lens is a convex lens having a convex portion at the finger side.

As described above, a reference numeral 24 denotes a region in which the bottom surface of the groove 12 of the casing 10 of the authentication unit is configured and the opening 20 for inputting transmitted light of the casing is closed by the IR filter 40.

A reference numeral 26 corresponds to the bottom surface of the casing 10. A reference numeral 28 denote a circuit board fixed to the casing 28 and the imaging sensor 30 composed of a charge coupled device (CCD) or a complementary metal oxide semiconductor (CMOS) is fixed on the circuit board. A peripheral circuit of the imaging sensor 30 is provided on the circuit board 28.

The lens casing 42 is formed in a hollow cylindrical shape so as to receive the lens unit 38. The end of the finger side of the casing 42 having the hollow cylindrical shape is fixed to the lower surface of the bottom surface 24 of the casing 10.

The lens unit 38 has the short focus/wide angle lens characteristics by combining concave-convex lenses. Accordingly, the lens unit can reach the finger which is a subject and an image in a wide range can be input to the imaging sensor although the lens unit approaches the finger.

Figure 5:
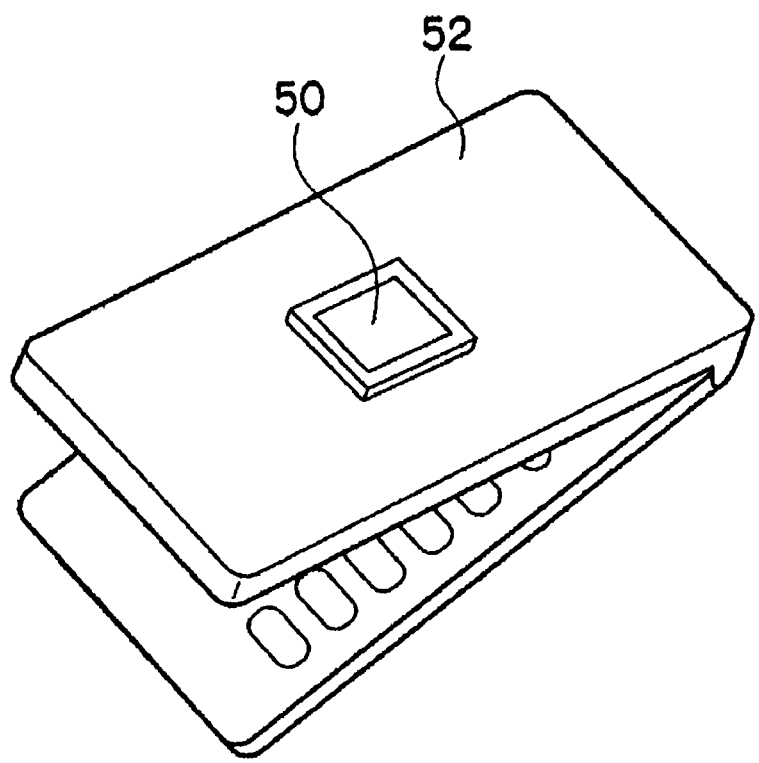
FIG. 5 is a perspective view of a mobile telephone in which the finger vein authentication unit is fixed.

As a result, a distance (conjugate distance) L1 between a finger bottom 46 and the imaging sensor 30 can be reduced and the conjugate distance can be included in a range of 5 mm to 12 mm by the examination of the present inventors. Accordingly, the thickness of the casing 10 can be reduced. For example, even when the finger vein authentication unit 50 is mounted in a casing 52 of a folder type mobile telephone shown in FIG. 5, it is possible to suppress the enlargement of the mobile telephone. FIG. 5 shows only an example and the finger vein authentication unit 50 may be mounted in another casing in which a key manipulation unit 53 is mounted.

In FIG. 4, a reference numeral 48 denotes a just focus position and a reference numeral L2 denotes a just focus length between the just focus position in the finger and the imaging sensor 30. The lens device 33 advances and retreats with respect to the imaging sensor 30 such that the just focus position 48 is included in the finger, thereby adjusting the interval between the lens unit 38 and the imaging sensor 30. Since the just focus position can be set in the finger although the distance (conjugate distance) L1 between the finger bottom 46 and the imaging sensor 30 is reduced, the imaging sensor 30 shown in FIG. 4 can form an image corresponding to the vein pattern in the finger.

As described above, although the short focus and the wide angle are described as the optical characteristics of the lens unit, a focal length is in a range from 0.2 mm to 0.5 mm and the angle of the object is 100° or more. If the focal length is less than 0.2 mm, it is difficult to manufacture the lens unit and, if the focal length is greater than 0.5 mm, the distance L1 of FIG. 4 cannot be set to a sufficiently small value. If the maximum angle of the object is 100° or more, it is possible to acquire the vein pattern in a range of 10 mm in the vicinity of the first joint of the finger. In order to improve the vein authentication accuracy, it is preferable that the vein pattern in this range is acquired.

It is preferable that the lens unit has paraxial magnification equal to or greater than 0.04 and equal to or less than 0.1. If the paraxial magnification is less than 0.04, resolution deteriorates and, if the paraxial magnification is greater than 0.1, a photographing area necessary for the vein pattern authentication may not be ensured.

If the short focus lens unit is used, as described above, the authentication unit can be downsized in a height direction thereof, but the image obtained by the imaging sensor 30 is distorted and thus the vein pattern may not be accurately extracted from the image.

The vein authentication unit has an image processing unit for correcting the distortion of the image. The present inventor confirmed that the optical distortion of the image can be corrected by the after-mentioned image processing unit in a range of −60% to +40% by changing the characteristics of the lens unit variously.

Although the lens unit 39 includes two lenses in the example of FIG. 4, the present invention is not limited thereto and the lens unit may include one lens or three or more lenses if the required lens characteristics are obtained.

Figure 6:
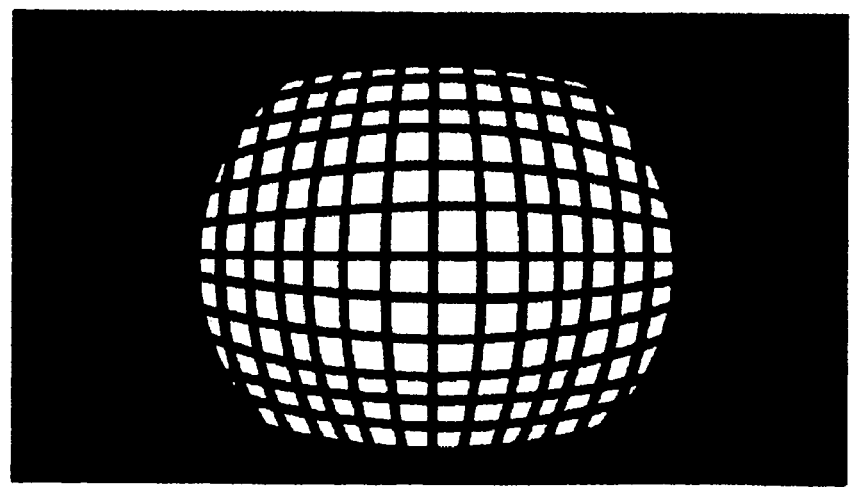
FIG. 6 is a view showing an image (distortion) obtained by an imaging sensor.
Figure 7:
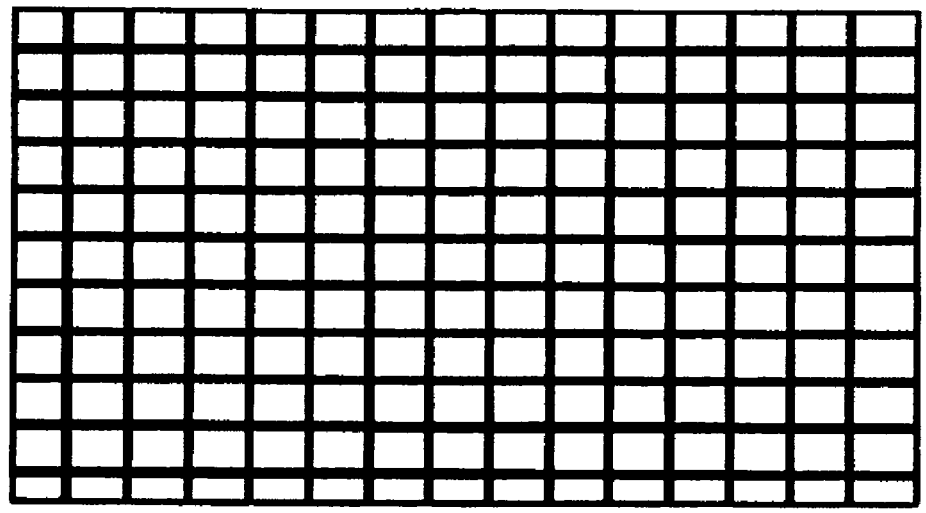
FIG. 7 is a view showing a correction image after correcting the distortion of the image obtained by the imaging sensor.

FIG. 6 shows the image obtained by the imaging sensor 30 before correction and FIG. 7 shows an example of the image after the distortion is corrected. The image of FIG. 6 is obtained by the imaging sensor 30 when a printed matter on which a grid-shaped image having an interval of 1 mm is printed is mounted on the topside of the casing 10 of FIG. 1. If the distortion is corrected, the image which is distorted toward the periphery as shown in FIG. 6 is corrected to the image having the substantially uniform grid shape as shown in FIG. 7. A method of controlling the correction will be described later.

Figure 8:
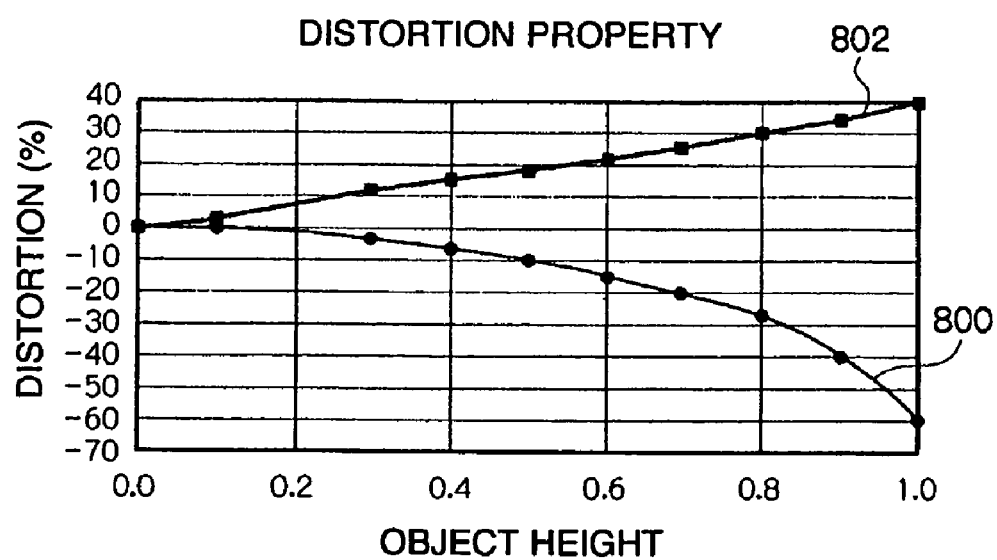
FIG. 8 is a characteristic view showing a relationship between an object height and distortion (%).

FIG. 8 is a graph showing the distortion characteristics. The object height of FIG. 8 indicates a relative position from the central point (optical axis: 41 of FIG. 4) of the image to the end of the image. For example, the object height "1.0" indicates the position of the end of the image and the object height "0.6" indicates the position of 60% from the central point (40% from the end).

In FIG. 8, reference numeral 800 denotes the characteristics of the first lens unit and 802 denotes the characteristics of the second lens unit. The minus distortion characteristics indicate that the pixel is distorted to the central side of the image and the plus distortion characteristics indicate that the pixel is distorted in a direction separated from the center of the image.

The distortion (%) is a value corresponding to "T/S" with respect to the original position (the distance "T" from the center) of the pixel and the position of the pixel (the distance "S" from the center) after distortion. The present inventors confirmed that, if the optical distortion is less than −60%, the resolution of the peripheral portion suddenly deteriorates and cannot be completely restored although the correction of the image distortion is performed.

If the optical distortion is equal to or greater than +40%, the image in a wide range needs to be processed and there is a problem in a processing time. Accordingly, if the distortion between the first characteristics (800) and the second characteristics (802) is restricted, that is, if the optical distortion is included in the range of −60% to +40%, the distortion can be corrected by the image processing unit.

As the characteristics of the lens unit, it is preferable that the brightness ratio of the maximum angle of the object is in a range of 10% to 40%. In the short focus/wide angle lens unit, as shown in FIG. 9, the brightness deteriorates toward the periphery of the image.

Figure 9:
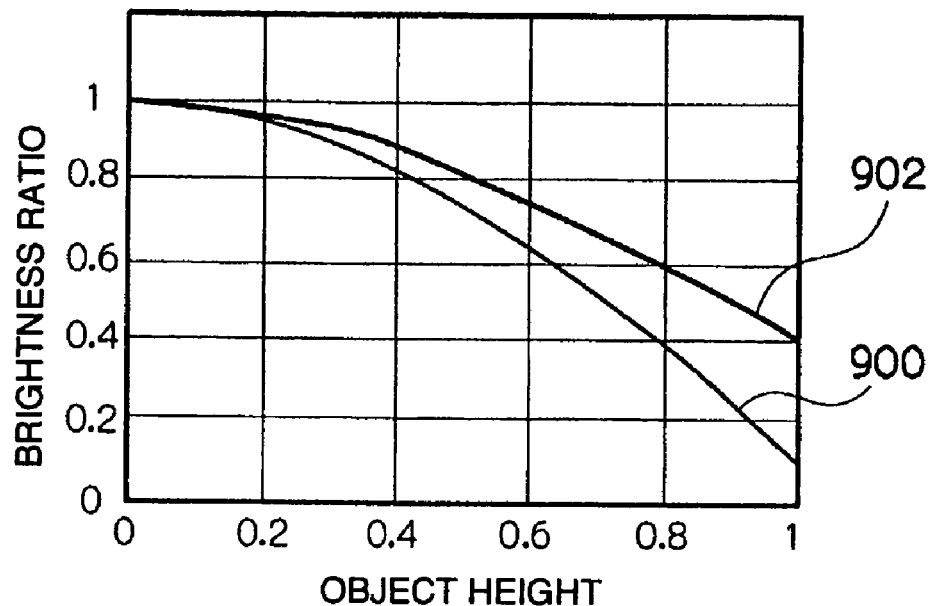
FIG. 9 is a characteristic view showing a relationship between an object height and a brightness ratio of a lens unit.

In FIG. 9, reference numeral 900 denotes the brightness ratio characteristics of the first lens unit and 902 denotes the sensitivity ratio characteristics of the second lens unit. For example, the sensitivity ratio "0.4" indicates that the brightness is 40% if the brightness of the center of the image is "1.0". The deterioration in the sensitivity of the short focus/wide angle lens unit can be compensated for by arranging the light emission side in the peripheral region of the casing 10 and irradiating the light from the side surface of the finger as shown in FIG. 1.

The present inventors confirmed that the deterioration in the sensitivity can be compensated for if the brightness ratio of the maximum angle of the object (the object height is "1.0") is between the characteristics (900) of the first lens unit and the characteristics (902) of the second lens unit, that is, if the sensitivity ratio is in a range of 10% to 40%. Accordingly, the imaging sensor 30 can receive the vein pattern in the finger from the region of the maximum angle of the object of the lens unit with high accuracy.

Figure 10:
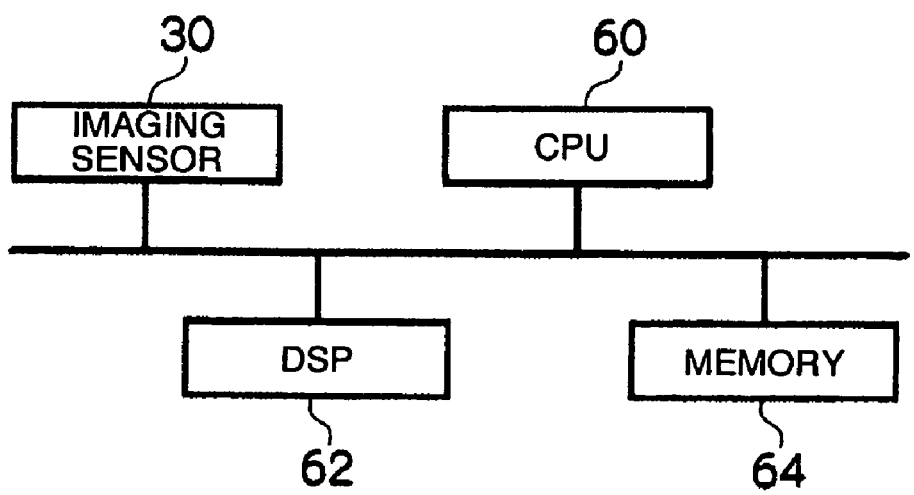
FIG. 10 is a hardware block diagram of an image processing unit of the finger vein authentication unit.

Next, the image processing unit of the finger vein authentication unit and the authentication function will be described. FIG. 10 is a block diagram showing the configuration example of the image processing function of the finger vein authentication unit.

A central processing unit (CPU) 60 starts an image processing program recorded in a memory 64 and instructs a digital signal processor (DSP) 62 to receive the image from the imaging sensor 30, on the basis of the operation of the user. The CPU 60 receives the brightness data of each pixel in the imaging sensor 30 from the DSP 62 and determines whether the finger is laid on the casing 10.

If the finger is not laid on the casing 10, the external light reaches the imaging sensor 30 and the brightness of the pixel is increased over a predetermined value. Thus, the CPU 60 determines that the finger is not laid on the casing 10. Alternatively, as described above, the touch sensors may be mounted on the small protrusions 18 and it is determined whether or not the finger is laid.

If the CPU 60 determines that the finger is laid on the casing 10, the brightness of each pixel in the image obtained by the imaging sensor 30 is checked and the amounts of light emitted from the plurality of light irradiation ports 14 are separately controlled such that the brightness becomes uniform in the pixels. In more detail, the driving signals supplied to the respective light sources which are arranged in correspondence with the respective light irradiation ports 14 are controlled to correct the amounts of light emitted from the light sources such that the amounts of light emitted from the irradiation ports 14 are controlled.

Hereinafter, light control will be described in detail. Since the adequate amount of light varies according to the width or the thickness of the indicated finger, the amount of light needs to be controlled for each finger in order to photograph a clear vein image. For example, if the thickness of the finger is small, the brightness tends to be higher compared with a thick finger and thus the amount of light is decreased. Since in a narrow finger, a distance from the light irradiation ports to the finger is larger compared with that in a finger with a large width, it is difficult for the light to reach. Accordingly, in order to irradiate a sufficient amount of light to the finger, it is necessary to strengthen the amount of light emitted from the light irradiation ports 14. Even in the same finger, since the width of the side of the fingertip and the width of the base side of the finger are different from each other, adequate light amount values thereof are difficult from each other. Accordingly, the light amount value of the side of the fingertip and the light amount value of the base side are independently controlled. Alternatively, using the characteristics that the width of the side of the fingertip is small and the width of the base side of the finger is large, the amounts of light are controlled in advance such that the amount of light of the side of the fingertip is increased and the amount of the light of the side of the fingertip, and then the base side of the finger may be simultaneously controlled. Alternatively, if the same amounts of light cannot help being irradiated, the light sources for the fingertip may be arranged close to the side of the fingertip and the light sources for the base side of the finger may be arranged far away from the base side of the finger. Additionally, in consideration of the positional deviation in left and right directions when the finger is laid and the horizontal non-symmetry of the shape of the finger, it is preferable that the light amount values in left and right directions are independently controlled. On the basis of the unbalance of the brightness between the plurality of pixels, CPU 60 determines the non-symmetry of the shape of the finger, the positional deviation in the left and right direction of the finger and the thickness of the finger, and independently controls the light sources at the left and right sides of the finger, the side of the fingertip and the base side of the finger.

If it is determined that the correction of the light amount is completed, CPU 60 instructs DSP 62 to correct the distortion with respect to the image photographed by the imaging sensor 30. The distortion correction is performed by a calculation based on the above-described distortion characteristics. Accordingly, the distortion characteristics of the lens unit are previously obtained before the shipment of the finger vein authentication unit, and the distortion characteristics are stored in the memory 64. DSP 62 corrects the distortion of each of the pixels of the image obtained by the imaging sensor 30 by properly referring to the distortion characteristics.

If the distortion is X %, a correction value (100/X) is multiplied to a pixel to be corrected of the image such that the pixel position to the image center (optical axis) is corrected on the basis of the calculated result. If the distortion is plus, the pixel position is corrected to the optical axis side and, if the distortion is minus, the pixel position is corrected in a direction separated from the optical axis. As a result, for example, as shown in FIGS. 6 and 7, the distorted image can be corrected.

CPU 60 stores the image after distortion correction in the memory 64, and CPU 60 determines the tint of each of the pixels in the monochrome image after correction and extracts the vein pattern from the corrected image (feature extraction). Since the infrared light irradiated from the light source to the finger is absorbed to hemoglobin in the vein in a process of being transmitted through the finger, while the infrared light is diffused by other tissues so as to be spread in various directions, the transmitted light corresponding to the vein pattern reaches the imaging sensor 30 via the lens unit 38. In the pixel region corresponding to the vein pattern, since the transmitted light weakens by absorption, the monochrome image in which a region corresponding to the vein pattern darkens is obtained by the imaging sensor 30.

CPU 60 detects the vein pattern from the monochrome image and performs biometric authentication using the detected vein pattern. In more detail, the vein pattern extracted by the finger vein authentication unit is registered in the memory 64 and the personal authentication is determined by determining whether or not the registered vein pattern is matched to the newly extracted vein pattern. In the case where the finger vein authentication unit is mounted in the information processing unit such as a mobile telephone or is wired/wireless-connected to an external unit, CPU 60 notifies the information processing unit or the external unit of the personal authentication result, and the information processing unit supplies a variety of services such as e-commerce or Internet banking to the user via the notification.

Although CPU performs a feature point extracting process after distortion correction in the above description, the distortion correction may be performed after the vein pattern is extracted from the image by the feature point extracting process. In this case, since the number of pixels which will be subjected to the distortion correction can be restricted to the number of pixels corresponding to the vein pattern, it is possible to reduce the processing time necessary for the distortion correction of DSP 62. Compared with the case where the distortion correction is performed with respect to all the pixels, the number of pixels necessary for the correction can be reduced to about ⅛ by performing the distortion correction after extracting the feature point.

Although CPU 60, DSP 62 and the memory 64 are separately configured in the example of FIG. 10, the present invention is not limited thereto and a portion or all of them may be configured as one processing unit.

In the case where the finger vein authentication device is mounted in the information processing unit such as the mobile telephone, the image processing and the authentication may be performed using CPU of the information processing unit, instead of providing CPU 60 in the authentication unit. A portion or all of the image processing and the authentication function may be moved from the information processing unit to the server. The vein pattern data may be registered in the server, instead of storing the vein pattern data in the finger vein authentication unit or the information processing unit. In the case where the vein pattern is registered in the finger vein authentication unit or the information processing unit, the vein pattern is encrypted and then registered so as not to be read by other persons.

Next, an embodiment in which the vein authentication unit according to the present invention is applied to a mobile telephone will be described in detail. As described above, the vein authentication unit according to the present invention can shorten a distance between the bottom of the finger and the imaging sensor and thus can be received in the mobile telephone.

Figure 11A:
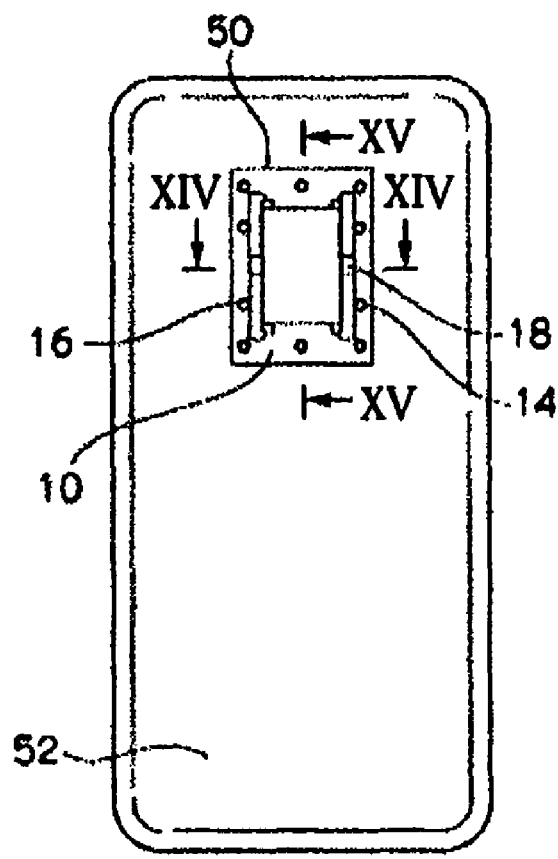
FIG. 11A is a plan view of a mobile telephone in which the finger vein authentication unit is fixed.
Figure 11B:
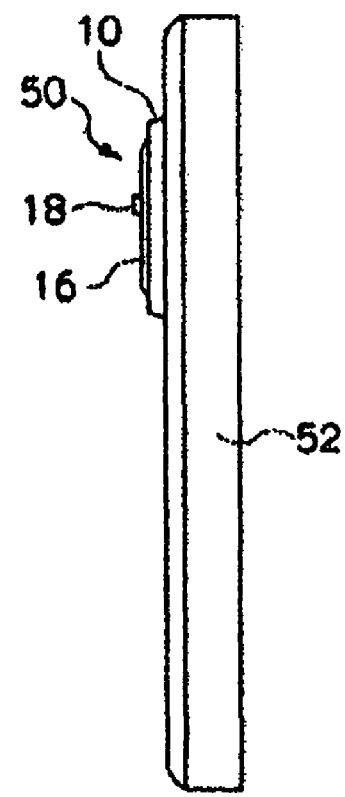
FIG. 11B is a right side view thereof.
Figure 11C:
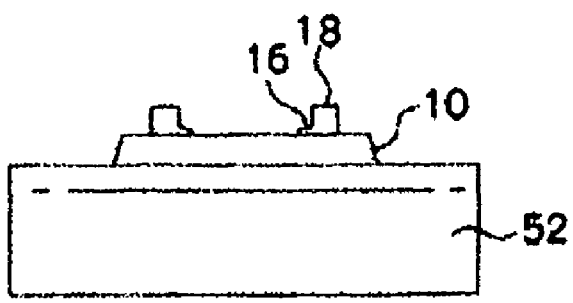
FIG. 11C is a front view thereof.

FIG. 11A is a plan view of a mobile telephone in which the vein authentication unit 50 is received near a hinge of the mobile telephone 52. FIG. 11B is a right side view thereof and FIG. 11C is a front view thereof. In order to easily allow the user to know the existence of the vein authentication unit, the casing 10 of the vein authentication unit slightly protrudes from the flat surface of the cover of the mobile telephone.

Figure 12:
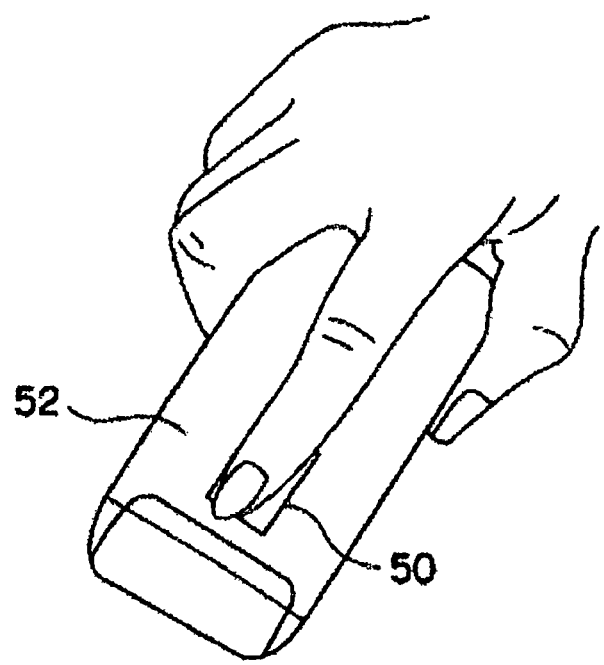
FIG. 12 is a perspective view showing a state that the mobile telephone in which the finger vein authentication unit is fixed is grasped by one hand, according to the first embodiment of the present invention.

As shown in FIG. 12, the user can lay the vicinity of the first joint of his/her index finger on the vein authentication unit 50 while grasping the mobile telephone 52 by his/her right hand. It is preferable that the front end of the vein authentication unit is provided at a position of about 3 cm separated from the front end of the mobile telephone such that the vicinity of the first joint of the finger to be authenticated is fitted into the vein authentication unit while grasping the mobile telephone.

Figure 13:
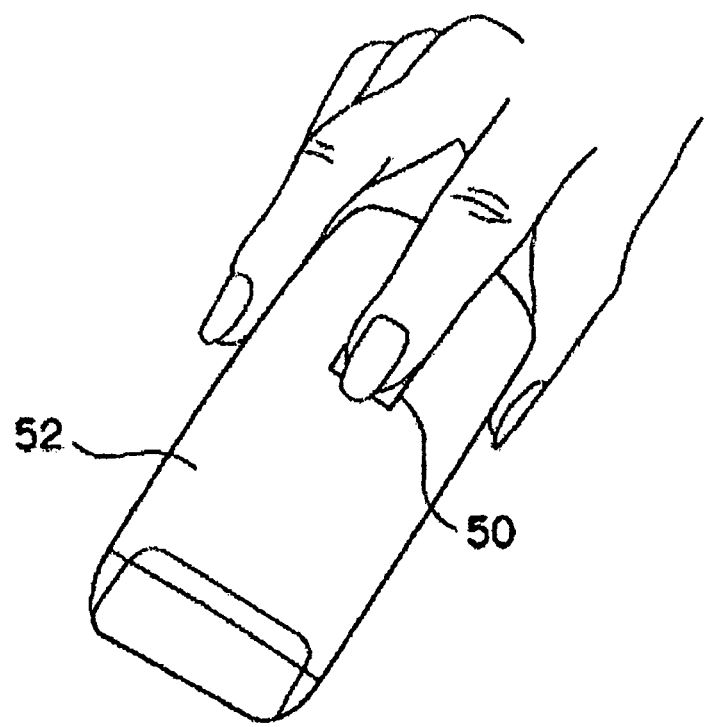
FIG. 13 is a perspective view showing a state that the mobile telephone in which the finger vein authentication unit is fixed is grasped by one hand, according to a second embodiment of the present invention.

As shown in FIG. 13, the vein authentication unit 50 may be provided near the opened end of the mobile telephone 52. Even in this case, it is preferable that the front end of the vein authentication unit is provided at a position of about 3 cm from the opened end of the mobile telephone substantially corresponding to a distance from the fingertip to the first joint of the finger such that the first joint of the finger to be authenticated is fitted into the vein authentication unit while grasping the mobile telephone by his/her one hand.

Figure 14:
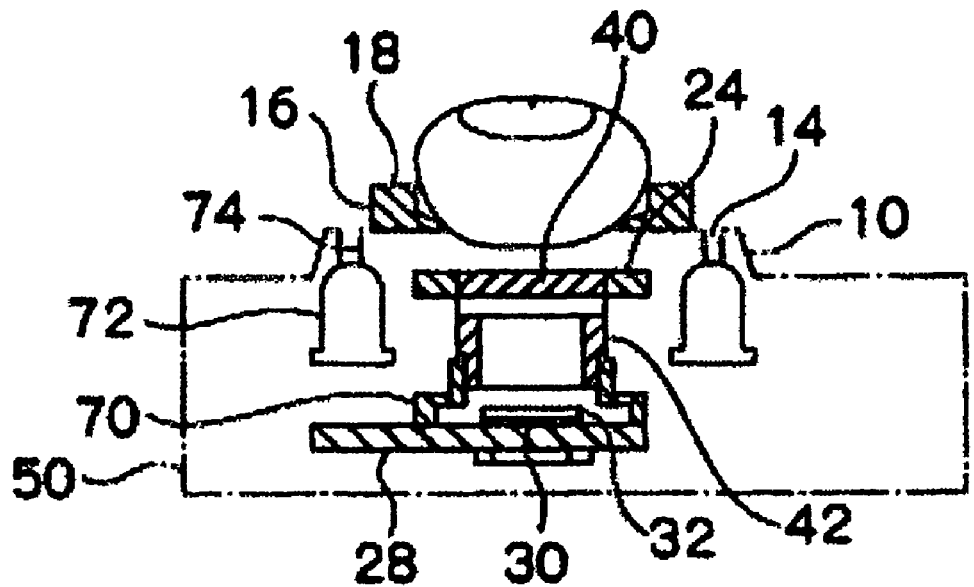
FIG. 14 is a cross-sectional view taken along line XIV-XIV of FIG. 11A.
Figure 15:
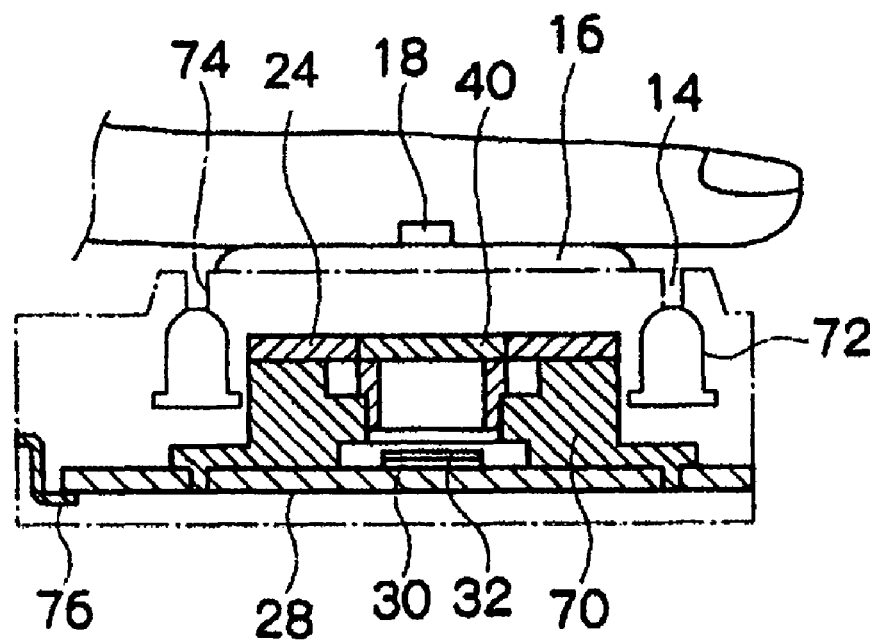
FIG. 15 is a cross-sectional view taken along line XV-XV of FIG. 11A.

FIG. 14 is a cross-sectional view taken along line XIV-XIV of FIG. 11A and FIG. 15 is a cross-sectional view taken along line XV-XV thereof. The state in which the finger vein authentication unit is integrally received in the mobile telephone 52 is shown in FIGS. 14 and 15. The same reference numerals as the above-described drawings represent the same members and thus the description thereof will be omitted.

LEDs 72 are embedded in the casing of the mobile telephone 52, through-holes 74 are formed in the casing 10 in a direction perpendicular to the width direction of the LEDs from the tops of the LEDs 72, and the through-holes 74 are connected to the irradiation ports 14. Near infrared light emitted from the LEDs passes through the through-holes 74 and advances from the irradiation ports 14 toward the finger. Since the wall 16 is provided in the vicinity of the bottom of the finger along the longitudinal direction of the finger, the light irradiated from the LEDs is introduced from the side surface of the finger into the finger over the wall 16.

The light introduced from the side surface of the finger is diffused in the finger and a portion thereof transmits through the vein so as to reach the imaging sensor 30, and the lens unit 38 forms an image corresponding to the blood vessel pattern from the transmitted light on the imaging sensor 30.

In FIGS. 14 and 15, a reference numeral 70 denotes a support member for fixing the lens casing 42 to the circuit board 28 and a reference numeral 76 in FIG. 15 denotes a member for supporting the circuit board 28 to the casing of the mobile telephone 52.

In FIG. 14, since the LEDs are positioned on the side surfaces of the finger, the width of the finger vein authentication unit is increased by the existence of the LED on the both sides of the finger. In contrast, in FIGS. 17 and 18, the LEDs which is positioned on the side surfaces of the finger is moved to the central side of the finger and the bottom side of the finger such that the width of the finger vein authentication unit is reduced.

Figure 18:
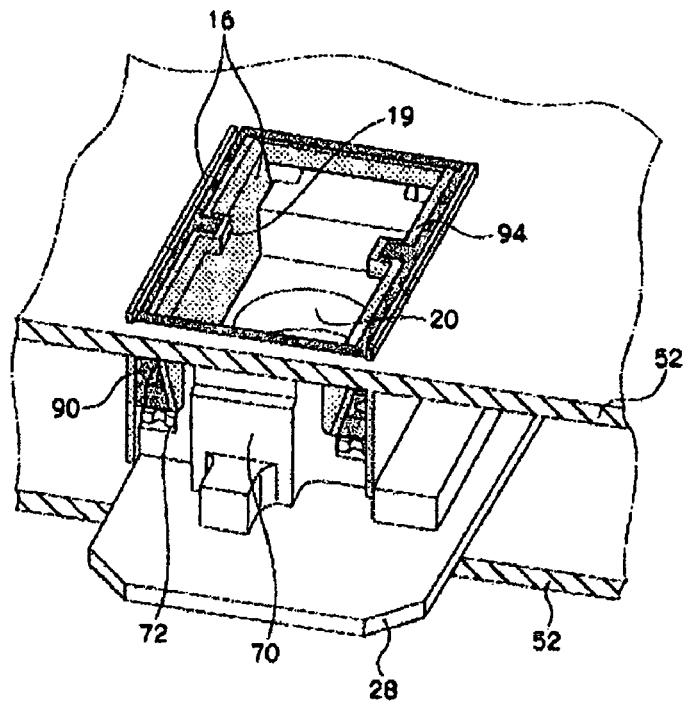
FIG. 18 is a partial cross-sectional perspective view of a finger vein authentication unit including a light guide for guiding light generated by a light source (LED) to an irradiation port of a casing.

While, in the finger vein authentication unit shown in FIGS. 14 and 15, the light generated by the LEDs is guided to the irradiation ports 14 via the through-holes 74 formed in the casing, but the light generated by the LED is guided to the irradiation ports by a light guide 90 in the finger vein authentication unit shown in FIGS. 17 and 18.

The light guide is provided in the wall 16 formed on the flat surface of the LEDs and having a light shielding function and has a tapered surface 92 in which the side surface in the diameter direction of the vein authentication unit is sloped as becoming close to the surface of the mobile telephone toward the outer circumference side of the mobile telephone, as shown in FIG. 17. The radiated light introduced from the LED into the bottom surface of the light guide 90 is guided along the tapered surface 92 and is emitted from the end surface 94 of the light guide formed in a rectangular shape to the side surfaces of the finger in the surface of the casing 52 of the mobile telephone.

If the light guides 90 are used in such a way, the light can be guided toward the light irradiation ports at the side surfaces of the finger along the light guides although the LED light source is provided on the side of the bottom surface of the finger. In addition, since the shape of the light irradiation ports of the light guides may have a rectangular shape instead of an annular shape shown in FIGS. 14 and 15, the light can be uniformly irradiated to the side surfaces of the finger.

Figure 19:
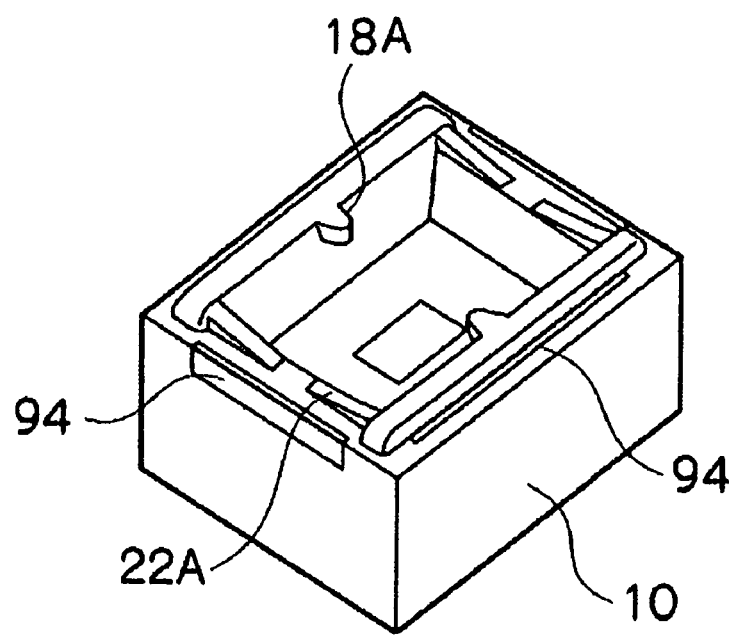
FIG. 19 is a perspective view of the finger vein authentication unit according to the second embodiment of the present invention.

FIG. 19 shows another embodiment of the finger vein authentication unit. While the protrusions 18A indicating the first joint of the finger protrude toward the finger side in the embodiment shown in FIG. 1, the protrusions 18A protrude toward the inside of the width direction of the casing 10 in this embodiment. While the small pieces 22A for guiding the finger toward the groove side is formed with the tapered surfaces as shown in FIG. 3 in the above-described embodiment, the tapered surfaces are formed in a curved shape according to the outer circumference shape of the finger in this embodiment.

Next, the shape of the wall 16 for photographing the clear vein image will be described in detail. FIG. 20A is a view of the authentication unit of the embodiment shown in FIG. 2 when viewed from the side of the fingertip. FIGS. 21A, 21B, 22A and 22B show other embodiments of the walls 16.

Figure 21A:
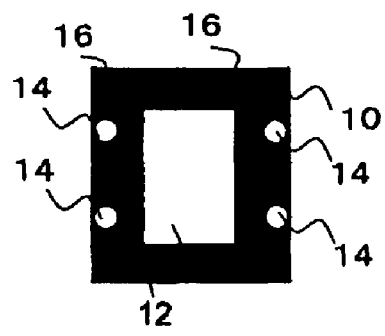
FIGS. 21A and 21B are cross-sectional views of a light shielding wall according to the second embodiment of the present invention.
Figure 21B:
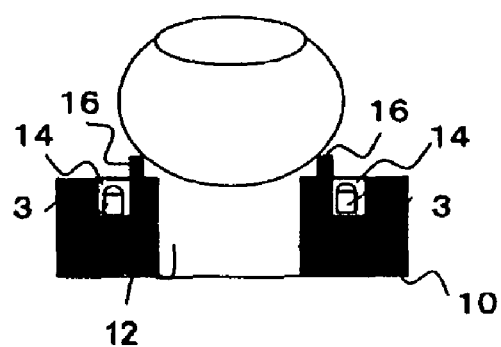

As shown in FIG. 20A, in the authentication unit of FIG. 2, the width of the wall 16 is substantially equal to the distance between the light irradiation port and the groove 12. The wall 16 may be provided close to the light irradiation port with a small width as shown in FIGS. 21A and 21B. Accordingly, a point for supporting the finger is moved outward. Since the finger has a round shape, the finger can be laid at a lower position if the supporting point is moved outward. Accordingly, since the height of the wall is increased relative to the finger, the light can be irradiated to only the high position in the finger. Accordingly, it is possible to acquire a clear vein image.

Figure 22A:
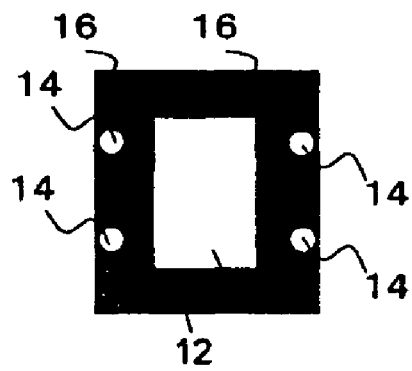
FIGS. 22A and 22B are cross-sectional views of a light shielding wall according to a third embodiment of the present invention.
Figure 22B:
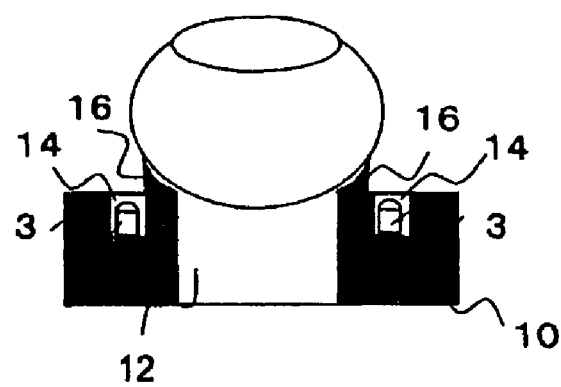

As shown in FIGS. 22A and 22B, the sidewall may be formed in a curved shape according to the outer circumference shape of the finger. Accordingly, since the contact area between the finger and the wall is increased, the effect of blocking the light to the bottom surface of the finger is increased. The position where the finger is laid becomes stable.

Figure 23A:
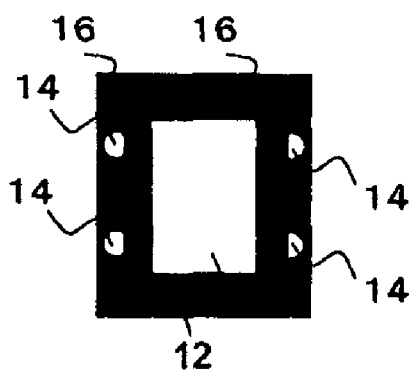
FIGS. 23A and 23B are views showing an example of a position where a light source is mounted.
Figure 23B:
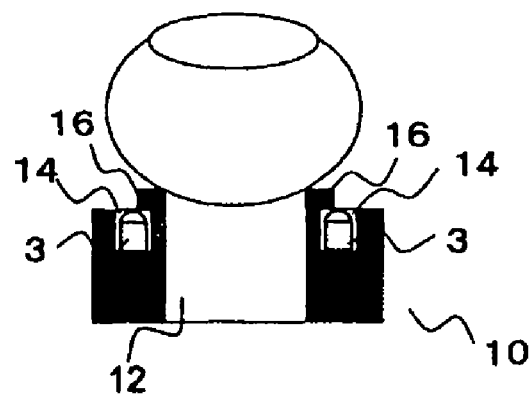

The light source 3 is mounted at a height in which the position of the upper surface of the light source 3 is equal to or less than that of the upper surface of the casing 10. Accordingly, the irregularities of the authentication unit are reduced. If a sufficient amount of light can be irradiated to the finger, a portion of the upper surface of the light source 3 may be covered by the wall 16 or the casing 10. For example, as shown in FIGS. 23A and 23B, if a portion of the light source 3 is hidden under the wall 16, the light source 3 may be mounted close to the inside (the side of the groove 12) of the authentication unit. Accordingly, it is possible to downsize the authentication unit.

FIGS. 16A to 16C are views showing an embodiment of a finger vein authentication unit in which a filter 230 of which a fading ratio of the light varies according to the region is mounted. FIG. 16A is a cross-sectional view of the unit, FIG. 16B is a front view thereof, and FIG. 16C shows the filter 230. The fading ratio of the light is high in a deep color region and is low in a light color region.

If the vein is photographed by the authentication unit in which the light source is mounted on the side surface of the finger as shown in FIG. 16B, the brightness value of the photographed image is increased in a region close to the light source and is decreased in a central region of the image. Accordingly, as shown in FIG. 16A, the filter 230 is mounted between the finger and the imaging sensor 30. Accordingly, the amount of light reaching the imaging sensor 30 becomes uniform in the left and right region of the finger and the central region and thus the vein image having the uniform brightness on the whole image can be photographed. Sensitivity control such as a gain or a shutter speed of each image may be performed by the imaging sensor 30, instead of mounting the filter 230. By decreasing the sensitivity of the pixel located at the light source side and increasing the sensitivity of the pixel of the central region, the same effect as the case of mounting the filter 230 can be obtained.

Although the lens unit includes two groups of two lenses in the above-described embodiment, the lens unit may include one lens or three or more lenses if the required lens characteristics can be obtained.

An object to which the vein authentication unit according to the present invention is applied is not limited to a mobile telephone and may be applied a variety of information processing units such as a personal digital assistant (PDA), a notebook type personal computer (PC). The finger vein authentication unit of the present invention is not limited to the information processing unit and may be mounted an automobile or an access control unit.

Although the protrusion is provided in the casing as the indicating means for indicating the position where the first joint of the finger is laid, the present invention is not limited thereto and a sign or a mark indicating the position where the first joint of the finger is laid may be used.

Although the finger vein authentication unit in the above mentioned embodiments is provided on the topside of the mobile telephone, the finger vein authentication unit may be mounted on the bottom surface of the mobile telephone or the side surface or the front surface of the mobile telephone.

Although the front side of the finger is laid on the casing 10 and the vein on the front side of the finger is photographed in the above-described embodiments, the side surface or the back side of the finger may be laid on the casing 10 such that the authentication is performed using the vein of the side surface or on the back side of the finger. In particular, in the case where the back side of the finger is photographed, the vein can be clearly photographed when the photographing is performed in a state of bending the finger.

Although the vicinity of the first joint of the finger is photographed in the above-described embodiments, the vicinity of the second joint of the finger or a part other than the joint may be used for authentication.

The embodiments are only exemplary and the present invention is not limited to the above-described embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A finger vein authentication unit comprising:
   a light source which irradiates infrared light to a finger;
   an imaging unit which images a vein image of the finger on an imaging side by the light from said light source;
   an opening through which the light from the light source passes;
   a light shielding wall disposed along a direction of a longer axis of said opening;
   a plurality of protruding pieces disposed in a vicinity of said opening and along a direction of a shorter axis of the opening, and
   wherein said protruding pieces are disposed in contact with said light shielding wall.

2. The finger vein authentication unit according to claim 1, wherein said light shielding wall is provided as a pair of light shielding walls disposed on both sides of said opening.

3. The finger vein authentication unit according to claim 1, wherein a height of each of said protruding pieces decreases from said light shielding wall toward said opening.

4. The finger vein authentication unit according to claim 1, further comprising an image calculation unit which processes the vein image imaged by said imaging unit.

5. The finger vein authentication unit according to claim 1, wherein a protrusion is disposed on a portion of said wall, and the protrusion is higher than a remainder of said wall.

6. The finger vein authentication unit according to claim 5, wherein said protrusion is arranged at a substantially central portion of said wall.

7. The finger vein authentication unit according to claim 5, wherein said protrusion is a touch sensor detecting a fact that the finger is on the touch sensor.

8. The finger vein authentication unit according to claim 1, wherein said finger vein authentication unit comprises a plurality of said light sources, and control means independently controlling an optical axis and/or amounts of light from each of said light sources.

9. The finger vein authentication unit according to claim 1, wherein a neutral density filter of which an attenuation factor of the light spatially varies is interposed between said opening and said imaging unit.

10. The finger vein authentication unit according to claim 8, wherein said plurality of light sources have different irradiation positions and which of the light sources is turned on is changed among the light sources according to a position of the finger.

11. The finger vein authentication unit according to claim 1, wherein said imaging unit includes an imaging sensor and performs sensitivity control of each of a plurality of pixels in said imaging sensor.

12. The finger vein authentication unit according to claim 11, wherein said sensitivity control is performed by gain adjustment and/or a shutter speed.

13. A finger vein authentication unit comprising:
   a light source which irradiates infrared light to a finger;
   an imaging unit which images a vein image of the finger on an imaging side by the light from said light source;
   an opening through which the light from the light source passes;
   a light shielding wall formed along a direction of a longer axis of said opening;
   a plurality of protruding pieces for laying a finger, which are disposed in a vicinity of said opening from said light shielding wall toward said opening, and
   wherein said protruding pieces are disposed in contact with said light shielding wall.

* * * * *